United States Patent
Labelson et al.

(10) Patent No.: US 9,939,905 B2
(45) Date of Patent: Apr. 10, 2018

(54) OPTICAL CONTROL OF DISPLAY SCREENS

(71) Applicants: Ross Conrad Labelson, Westbury, NY (US); Daniel John Hyman, Long Beach, CA (US)

(72) Inventors: Ross Conrad Labelson, Westbury, NY (US); Daniel John Hyman, Long Beach, CA (US)

( * ) Notice: Subject to any disclaimer, the term of this patent is extended or adjusted under 35 U.S.C. 154(b) by 736 days.

(21) Appl. No.: 14/075,668

(22) Filed: Nov. 8, 2013

(65) Prior Publication Data

US 2014/0132503 A1    May 15, 2014

Related U.S. Application Data

(60) Provisional application No. 61/724,448, filed on Nov. 9, 2012.

(51) Int. Cl.
| | | |
|---|---|---|
| *G06F 3/01* | (2006.01) | |
| *G06F 3/0354* | (2013.01) | |
| *G06F 3/038* | (2013.01) | |
| *G06F 3/041* | (2006.01) | |
| *G06F 3/044* | (2006.01) | |
| *G06F 3/0488* | (2013.01) | |

(52) U.S. Cl.
CPC ............ *G06F 3/017* (2013.01); *G06F 3/0386* (2013.01); *G06F 3/03545* (2013.01); *G06F 3/044* (2013.01); *G06F 3/0416* (2013.01); *G06F 3/04883* (2013.01)

(58) Field of Classification Search
CPC .... G06F 3/017; G06F 3/0416; G06F 3/04883; G06F 3/0386; G06F 3/03545; G06F 3/044
See application file for complete search history.

(56) References Cited

U.S. PATENT DOCUMENTS

| | | | | |
|---|---|---|---|---|
| 3,735,395 A | * | 5/1973 | Iwabuchi | G06F 3/0386 341/24 |
| 6,097,373 A | * | 8/2000 | Jakobs | G06F 3/0386 345/158 |
| 8,692,798 B1 | * | 4/2014 | Zhang | G06F 3/042 345/173 |
| 2004/0090428 A1 | * | 5/2004 | Crandall, Jr. | G06F 3/04886 345/173 |
| 2006/0197745 A1 | * | 9/2006 | Yokozawa | H04N 5/4403 345/158 |
| 2007/0195205 A1 | * | 8/2007 | Lowe | G06F 3/0386 348/734 |

(Continued)

*Primary Examiner* — Nicholas Lee
*Assistant Examiner* — Robert Stone
(74) *Attorney, Agent, or Firm* — Jones Day (57) ABSTRACT

A display can be modified to be activated remotely with optical signals. A laser diode of one frequency can be used for tracking and targeting, with another frequency used to trigger the equivalent of a touch, click, drag, or other conventional input commands. Signal processing correlates trigger signals of specific commands, which can be expanded to include multi-click, multi-touch, gestures, and even custom commands specific to individual users. Modern capacitive touch screens can be upgraded with a transparent film overlay to provide these capabilities, which has never before been possible. Related systems, apparatus, methods, and articles are also described.

32 Claims, 3 Drawing Sheets

(56) References Cited

U.S. PATENT DOCUMENTS

| | | | |
|---|---|---|---|
| 2008/0074402 A1* | 3/2008 | Cornish | G06F 3/0421 345/176 |
| 2011/0122097 A1* | 5/2011 | Tsang | G06F 3/0428 345/175 |
| 2013/0002584 A1* | 1/2013 | Leem | G06F 3/04886 345/173 |
| 2013/0021237 A1* | 1/2013 | Kao | H04N 21/42222 345/156 |
| 2013/0057484 A1* | 3/2013 | Chiu | G06F 1/1601 345/173 |
| 2013/0222427 A1* | 8/2013 | Heo | G06F 3/011 345/633 |
| 2013/0328835 A1* | 12/2013 | Ahn | G06F 3/042 345/175 |
| 2015/0009181 A1* | 1/2015 | Chang | G06F 3/0418 345/175 |

* cited by examiner

OPTICAL CONTROL OF DISPLAY SCREENS

CROSS-REFERENCE TO RELATED APPLICATIONS

This application claims priority to U.S. Provisional Application No. 61/724,448, filed on Nov. 9, 2012. This priority application is herein incorporated by reference in its entirety.

FIELD

The subject matter described herein relates to electronic displays and interaction therewith, including, but not necessarily limited to, the use of laser pointers to control capacitive touch screen displays, including those of smart phones, tablets, computers, and control centers.

BACKGROUND

Displays and monitors are critical features of nearly every office, control center, purse, and pocket in the world as a means to transform data into information that can be readily received and understood by a viewer, user, or operator. Displays in recent years have transformed from a predominant role of passive information provider into a role that incorporates data input as well, providing an interactive experience as control technologies are added. The capacitive touch screen, for example, is ubiquitous for consumer electronics such as cellular telephones, tablets, and notebook computers, and is becoming commonplace on larger displays for control centers across government and industry, where operators now work long hours in front of touch screens instead of using legacy keyboard and mouse-type controllers.

Government and industry users have many displays and control centers that are in need of improved functionality, faster response time, and enhanced sensitivity to operator conditions. An immersive control environment enables operators of remote systems, sensors, manufacturing equipment, and unattended vehicles to perform at higher levels of effectiveness, provided operators are appropriately monitored for stress, overwork, fatigue, and other negative conditions. There is a large and rapidly growing need for technologies to improve the telepresence environment, and improve human performance and associated aspects of the human condition during teleoperation.

The opportunity is to provide an improved operator interface that provides the ability to use natural gestures, commands, and cues to provide real-world commands, but that also provides the ability for auxiliary monitoring systems to track, record, and assess operator performance and status. A system that performs both functions with a minimum of additional cost and training, and that augments existing control interface technologies will provide significant benefit to government and industry through reduced user fatigue, faster user response times, enhanced capabilities, and the ability to more easily monitor usage and performance without interfering with the interface itself.

Of particular value to these industries would be a subsystem that augments present touch screens, either during manufacturing or with an aftermarket overlay, enabling the use of laser pointers (or other highly collimated electromagnetic energy sources) to control the screen. In such a subsystem, a laser would enable the user to perform the traditional point, click, click-and-drag, multi-touch, and multi-touch-and-drag features known intrinsically by the majority of the population, except they would perform these actions with small motions of their fingers, wrists, or heads instead of with their arms. If the touch screen control software is sufficiently capable, laser pointer control could also provide additional "hotkey" functionality, with the addition of scroll functionality and assignable click functions using coded bursts of laser energy that can be transmitted much faster than a user could touch or multi-touch by hand. Additional functions could be assigned to gestures instead of clicks, providing a new category of commands that become relevant and possible for display input devices.

Remote optical control of displays in control centers would provide many advantages over conventional touch screen displays. Remote optical control would reduce operator fatigue, eliminating a common repetitive stress injury known as "gorilla arm," a muscular and tendon soreness caused by large arm movements. It would improve response speed through multi-touch or multi-click actions, as well as large area movements such as a screen swipe or enlarge command that would be difficult to perform quickly by hand across a display having a large area, or even one the size of a large tablet or notebook computer.

An additional category of capabilities that are needed throughout the government and industrial control community, in particular, is the ability to monitor operators for signs of degrading performance, such as typically occurs under conditions of stress or fatigue. Optical control commands enable the use of infrared, ultraviolet, and other frequencies that are invisible to the human eye, so that fingers, hands, and/or head monitoring can be performed in a way that does not disrupt the operator. Tracking of infrared laser spots, for example, enables detection and assessment of subtle cues such as vibration, drift, degrading response time, and other performance characteristics indicative of fatigue, stress, drug use, and other human conditions of interest. These can be monitored and assessed with reduced processing complexity relative to facial video capture systems, and less obtrusively than electrical pad monitors and other skin sensor techniques.

Some attempts have been made to use remote controllers for display systems in the past. These have included infrared, microwave, and ultrasonic frequency emitters or detectors on the controller, with detectors or emitters, respectively, mounted to the sides of the display screen. Phase differences, timing differences, and other cues are used to determine the general direction of aim by the controller, and often other signaling techniques, including hardwired electrical switching, are used to determine the control action (e.g., "fire weapon" or "reload" for an arcade game). Controllers in the gaming community have also turned to sonic full-body assessment of large motions, providing capabilities for wider range variation and gesture recognition, but with very poor registration and aiming accuracy, and no capability to support multi-touch and other commands with high complexity and precision.

While these gaming systems are generally inexpensive to manufacture and install, and sometimes include reliable decades-old technologies, they suffer from significant limitations. All of these controllers have generally poor accuracy and precision when compared to modern touch screen displays. They do not generally incorporate multi-touch or multi-click features. They do not generally have the ability to upgrade the capabilities of an existing control room display or consumer device in an aftermarket capacity. All but the sonic field systems do not have a broad range of acceptable operating space, and typically can only properly register commands from tens of centimeters to a meter or two away. If the controller is closer or further, accuracy degrades further, if it functions at all, in terms of receiving triggering commands.

Developers have pursued integrating optical sensitivity of a screen or touch screen during its original manufacture. For example, the function of remotely controlling a touch panel using laser energy, where such sensitivity is added as part of manufacturing a touch panel explicitly with such capability has been attempted. In these situations, however, when any high power laser energy activates such a panel, they do not provide for the ability to employ separate targeting and actuating frequencies and energy levels, nor for multi-touch capabilities. Sensor and circuit elements providing this basic function, but without addressing the need for separate targeting and actuation, multi-touch capabilities, or aftermarket modification of pre-existing touch screens have also been described.

Despite the wide-ranging efforts by numerous developers to provide wireless or partly wired controllers for interacting with displayed information, no solution provides for upgrading a capacitive touch screen with an aftermarket capability to recognize direct, accurate spots for targeting. Furthermore, no solution provides for the capability to address multiple spots for multi-targeting or separate optical characteristics for spots used for operator targeting those used for triggering. No prior solution provides for multi-click and gesture recognition capabilities. No prior solution provides for separate unobtrusive operator monitoring capabilities at a low system and processing algorithm complexity. No prior solution addresses a wide range of display markets, from government control systems to consumer tablets with equivalent applicability.

SUMMARY

In one aspect, a method of optical display control, including transmitting electromagnetic signals towards a display, activating sensors embedded in the display facing, and employing signal processing to determine if the controller is aiming at a particular location, and if the controller is triggering one or more activating signals. If the controller is triggering an activating signal, the display alerts the system to the aimed location and type of triggering signal.

In an interrelated aspect, an optical display control subsystem includes a controller apparatus that transmits an outbound optical signal toward a display apparatus containing a sensor. The display sensor receives the inbound optical signal from the controller, generating sensor output signals. A processor analyzes the sensor output signals to determine whether control signals of interest were received.

In a further interrelated aspect, optical signals are transmitted towards a display apparatus having electrical sensitivity to particular characteristics of electromagnetic energy. When illuminated with electromagnetic energy having these particular characteristics, the display apparatus outputs a signal denoting the presence of said electromagnetic energy. A processor examines the output signal and compares it to a library of empirically or theoretically derived signatures and/or patterns for the presence of a pre-defined control trigger. The presence of the trigger signal relative to the display is identified and reported to the processor and/or user.

In some variations one or more of the following can optionally be included. The optical signal can optionally be a millimeter-wave signal, a sub-millimeter-wave signal, a quasi-optical signal, an X-ray, or other essentially collimated electromagnetic energy of higher or lower wavelength than those signals generally referred to as optical signals. The transmission of the optical signals can optionally be made with high directionality greater than about 1,000. The transmitted optical signals can optionally cover a range of frequencies that include visible light. The optical signals can optionally cover a range of frequencies that include non-visible light for the purpose of invisible tracking and/or triggering. The transmitted optical signals can optionally have variances in phase and amplitude with both time and frequency due to speed and direction of the transmitter relative to the display. The display sensor apparatus can optionally detect variances in phase and amplitude with both time and frequency to determine the speed and direction of the transmitter relative to the display. The signal processing can optionally additionally resolve and identify movements of the optical signal, to determine the presence of user commands that vary over time, such as gestures, geometric shapes, swipes, and other signals more complex than simple triggers.

Articles are also described that comprise a tangibly embodied machine-readable medium operable to cause one or more machines (e.g., computers, tablets, etc.) to result in operations described herein. Similarly, computer systems are also described that may include additional processing capabilities and memory. The memory may include one or more programs that cause the processor to perform one or more of the operations described herein.

The subject matter described herein can provide, among other possible advantages and beneficial features, systems, methods, techniques, apparatuses, and article of manufacture for detecting optical signals that are aimed at a display configured to resolve the specific characteristics of those signals. Implementations of this subject matter could provide critical advantages of control command complexity and speed. Received signal signatures can be compared against specific commands that may be user-defined or user-trained (i.e., learned commands unique to a user or performed in a unique manner such as a paper signature). Unlike conventional methods of receiving remote controller input, the present subject matter can, in some implementations, be used in a manner in which only signals from the user or from a specially coded device will be recognized or otherwise treated in a special manner. This can eliminate potential security breaches or accidents in environments with multiple controllers, as well as enable multiple controllers to control a display or displayed application differently.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings.

DETAILED DESCRIPTION

The subject matter described herein can provide new sensing techniques and interface apparatus for improved control of systems and monitoring of system users. The control of computing, processing, sensor, and actuator control systems of many types can be improved by employing the subject matter. The monitoring of the users of these systems can be improved by employing the subject matter through easier tracking, identification, and reporting of user physiological and psychological status.

Existing limitations of conventional display control methods can be overcome by adding optical control. Conventional touch screen displays do not allow for remote access from a distance, and trigger commands are limited in functional variety, and limited by the gross hand movement and arm speed of the operator. Conventional infrared sensor display controls have a severely limited range of acceptable user distance, and have insufficient accuracy for critical system control, as well as the majority of consumer electronics applications. Prior developments in integrating optical control sensitivity to touch screens do not address separate tracking and triggering functions, multiple touch and signature recognition capabilities, or the ability to add optical control to conventional touch screens already manufactured and in use. No conventional technology can be readily added to existing capacitive touch screens as an aftermarket modification to provide additional control functions and features with little system intrusion.

Existing limitations of conventional user monitoring methods can be overcome by augmenting optical control with optical monitoring and processing. The most widely used method of monitoring control system users relies on supervisor oversight, regular break periods, and pre-determined limitations on cognitive work load that are rarely operator-dependent or address localized acute or chronic conditions in a systematic way. These methods are sporadic and imprecise, requiring lengthy training and experience for supervisors, and often fail to identify subtle cues before performance degrades, sometimes with lethal consequences (e.g., friendly-fire or civilian casualties). Other methods employ biometric readings, which are much more accurate in assessing user condition, especially over time and for specific individuals, but to be effective, conventional systems need to be obstructive, distracting, and/or demeaning. Emerging facial recognition analytical techniques, while capable of effective monitoring accuracy with a minimum user obstruction, are computationally intensive, requiring substantial video and processing resources.

The methods provided herein accomplish both improved control and improved monitoring. Control is improved by providing for remote visibility, targeting, triggering, and greatly expanded trigger signal options. In some implementations of the present subject matter, such improved control can be added to pre-existing capacitive touch screen systems through the application of a predominantly transparent (but highly functional) film and use of optical controllers to control the touch screen at a distance. Monitoring is improved by providing for unobtrusive detection of user performance characteristics and enabling analysis with comparatively low processing requirements.

According to various implementations of the currently disclosed subject matter, a display sensor apparatus can be used to detect optical signals while they are illuminating a display. Although there are a number of different electromagnetic signals (including but not limited to visible, infrared, and ultraviolet optical frequencies, millimeter waves, submillimeter waves, terahertz radiation, and x-rays), these are hereafter defined by the general term optical signals in the context of the present subject matter. These signals, insofar as they have high directivity or collimation and are illuminating a region of a display, or a region of work space surrounding a display operator, are herein referred to as optical signals.

Furthermore, according to various implementations of the currently disclosed subject matter, optical signals that contain additional time and/or space varying information associated with known triggering commands or gestures are referred to as trigger signals and trigger gestures, respectively. Optical signals used for user targeting and monitoring (in lieu of, or in addition to, triggering functions) are referred to as tracking signals. Trigger signals and trigger gestures are distinguished from optical signals that are not performing a triggering function, or which are not aimed at the display. Such optical signals would universally be considered tracking signals.

As optical signals are converted into electrical phenomena by sensor elements, the resulting signal is referred to as sensor data, trigger data, and/or tracking data according to its purpose. As a practical matter, signals aimed at the display are the most interesting to examine, although tracking signals that have drifted away from the display area may be of considerable interest to a monitoring system, and therefore tracking data may be provided by optical sensors that augment display sensors. The following description first discusses the functional means by which optical signals can be transformed into trigger and tracking data for display control, then continues with details of a specific implementation of this subject matter.

A remote display control method can in some implementations identify and locate the tracking and triggering signals transmitted from an optical controller, with the goal of accurately transforming signals into trigger data containing the location and type of trigger. This translates the intent of the user into a precise actionable electrical signal in the system being controlled. There are a number of general concepts in conventional display control, whereby capacitive touch screen sensor elements and electronics control module could directly or indirectly aid in the detection and location of optical tracking and trigger signals.

Improved display control systems and user monitoring methods have been highly sought after for years due to the increasing quantity of data, information, and systems requiring high levels of user attention. Automation of controls has greatly alleviated these needs, but human supervision is always needed in critical systems, particularly weapon, power, and aerospace systems where automated decision-making without capable human oversight can lead to disaster. Systems enabling remote control have limited options for control commands, limited accuracy, and often an unacceptably high probability of interception, obfuscation, or confusion with its attendant security and safety risks. Systems for operator monitoring have limited options that directly conflict unobtrusiveness with effectiveness, and generally still rely on the vagaries of human intuition and experience to provide supervisory oversight of operator condition.

Conventional legacy controllers and touch screen control methods generally are capable of providing moderate performance, and are the standards of the control community. Legacy controllers such as joysticks and gaming consoles have limitations with speed and precision of certain types of operations, such as fast object tracking and large motions. In addition, users have higher incidence of physiological repetitive stress effects (e.g., carpal tunnel syndrome) when using legacy controllers over long periods of time under conditions of mental stress. Touch screen controls have different advantages in large area speed and precision, but lack the capability to trigger multiple times quickly around localized regions, as compared to legacy controllers. Regular users of large-area touch screens in government, industrial, and gaming applications have repetitive stress problems of their own, suffering arm muscle and tendon soreness due to large area movements while attempting to maintain high levels of both speed and precision.

The subject matter described herein provides advantages over existing touch screen and remote display control methods because it employs highly precise optical signal tracking and targeting, allowing users to make wide area movements with both precision and speed, essentially allowing users' hands and input methods to work as quickly as their minds and eyes. Targeting and triggering occurs at the speed of light and attendant sensor electronics, allowing for a vast range of targeting codes for trigger signals, as well as rapid gestures to be accommodated by the system. Additionally, tracking and targeting can occur at a wide range of user distances, enabling supervisors or other users to assist in operating a given display or group of displays if necessary. User fatigue and stress is reduced due to lower physiological overhead of display control, and monitoring of this state is easier to accomplish with optical controllers continuously providing unobtrusive data to a monitoring system.

The optical signals of greatest interest for users tracking their own controller aim locations (i.e., tracking signals) are in the visible spectrum, whereas monitoring and trigger signals may be best performed outside of the primary visible spectrum. This enables the operator to see where he is pointing his controller, but not be unduly distracted by monitoring and/or triggering functions. Most humans see in the visible range of light having wavelengths between 380 and 760 nm. This correlates with the properties of most display systems, which seek to minimize power waste and therefore not emit much power in the non-visible spectrum either below or above that range. If tracking is performed in this frequency range, then the operator can see his or her own controller illumination, and could readily be accomplished using any of a set of red to green laser diodes used in consumer laser pointers.

According to various implementations of the currently disclosed subject matter, optical signals of greatest interest in user triggering and monitoring are those that fall at the edges or outside of the visible spectrum. The human eye begins to lose the ability to focus on light with wavelength shorter than about 410 nm, the frequency of blue-violet light, and longer than 740, the frequency of deep red light. The sensor elements responsible for transforming trigger signals must be sensitive to the frequency of the trigger signals used. Similarly, the sensor elements responsible for transforming monitoring signals must be sensitive to the frequency of the monitoring signals used. It may be instructive to note that in other implementations of the subject matter, trigger functions could be accomplished at the same frequencies as tracking, although coding, directionality, or power levels must be established to ensure that the tracking signal or the display itself do not accidentally self-trigger. An example would be a tracking signal using red laser light at 0.1 mW of power, which increases to 5 mW of power when triggered upon a display sensor containing embedded nanoelectronic sense elements requiring 1 mW for electronic percolation. The low-energy tracking laser spot would be readily visible to the user, but the display would ignore the low-power light. When the user triggered the higher power level, the sense elements would detect the higher power level, and the display sense electronics would register receipt of the trigger signal, accordingly.

The range of the optical display control method can be highly dependent on the optical signal power, beam directivity, signal frequency, and signal processing capabilities available to a display or associated system employing these methods. This is because a system employing these methods must discern the optical signals from what will typically be an environment containing light from other sources, such as daylight, artificial lighting, and the light from the display itself. The transformation of optical signals to electrical signals by the sensor also contributes timing, power level, frequency, and noise limitations to the range capabilities of an optical display control method.

An optical signal travels in air at nearly the speed of light ($c \sim 3 \times 10^8$ m/s), so a display control system employing these methods might have a theoretical range of many hundreds of meters with only a few microseconds of delay between when a signal is transmitted and when the most relevant reflected signals are returned. One microsecond of delay, for example, would be enough time to permit the control of a target about 150 meters away, which is a long enough range to encompass the vast majority of display control scenarios. Physical range, therefore, does not provide significant limitation to the operable range of a system employing these methods based on propagation delay alone.

Increasing range of the controller to the display reduces the localized intensity power of the received signal due to the increasing spread of the optical signal, with the edges of a spot typically falling off in power at a squared relationship in accordance with Gaussian (or near-Gaussian) beam characteristics. Increasing range increases the transmitted power required for the controller, or equivalently increases the required sensitivity of receive electronics and signal processing. Modern capacitive touch screen processing techniques can effectively lower the minimum detectable signal, and integration techniques for multiple signals can also increase effective range. Improving the directivity of the optical signal transmitter is one easily achieved method, especially when using highly collimated laser diodes, although this comes at greater size, weight, and cost for a controller. All of these system design techniques are appropriate for use in this subject matter by those skilled in the art. Even with these improvements, however, the signals to be detected will be of very low power level if eye safety recommendations and other electromagnetic signal transmission limitations are to be met.

An example is important to aid a designer in developing a system with a highly relevant and feasible set of operating capabilities. Consider an optical display control system operating at 405 nm and an in-band transmitter power of 1 mW. It is desired for a capacitive touch screen display to detect an optical trigger with a maximum spot size of 20 mm (the width of a large adult index finger). This width corresponds to 57 pixels on a typical capacitive touch screen, which is wider than most mobile guidelines recommend for touch target sizes, and therefore represents a reasonable maximum target spot size for effective targeting and triggering on many displays. Typical low-cost laser diodes emit radiation in a Gaussian profile, so a well behaved beam from a 4 mm diameter emitter could conceivably control a display at 50 meters or more, with the exact range based on the exact radiation profile of the controller. In a typical envisioned application, such a range exceeds the requirements for operators and/or supervisors to control most display systems. Conversely, it suggests that smaller touch screen trigger locations can be used with optical control systems, enabling greater precision than finger control, and providing attendant advantages in many applications, such as enhanced selection of internet links and other content optimized for large screens yet viewed on a smartphone or other small screen.

An optical display control method according to some implementations of the current subject matter could employ transmitters with low to moderate optical powers (for example, between 0.01 mW and 20 mW) using high gain focusing optics or antennas (in some examples, at least 60 dBi) and with an effective maximum operable range of between 5 m and 200 m. This effective and operable range might be considerably longer at night, with clear (dust free and low-humidity) air, or when using longer wavelength signals. Such display system characteristics could be readily applied to control centers, consumer electronics, portable, and/or vehicle-mounted display systems. It is further recognized that applications demanding opposing requirements of lower powers and longer operable range in a system employing these methods may require higher levels of display sensor sensitivity, different trigger pulse shaping techniques, and/or more advanced hardware and signal processing techniques than those suggested herein.

Throughout this description, possible physical and electrical characteristics for elements of a system employing methods according to the subject matter described herein have been suggested. An illustrative example of the current subject matter includes detection of 1-5 mW power transmitted by 405 nm blue-violet lasers, without detecting equivalent power levels of 810 nm infrared lasers. The current subject matter is discussed in regards to this example. However, it will be readily understood from the following description and the figures that a wide range of other control signals can be detected in a similar manner by modifying various settings and/or signal processing techniques, inputs, or algorithms.

Figure 1:
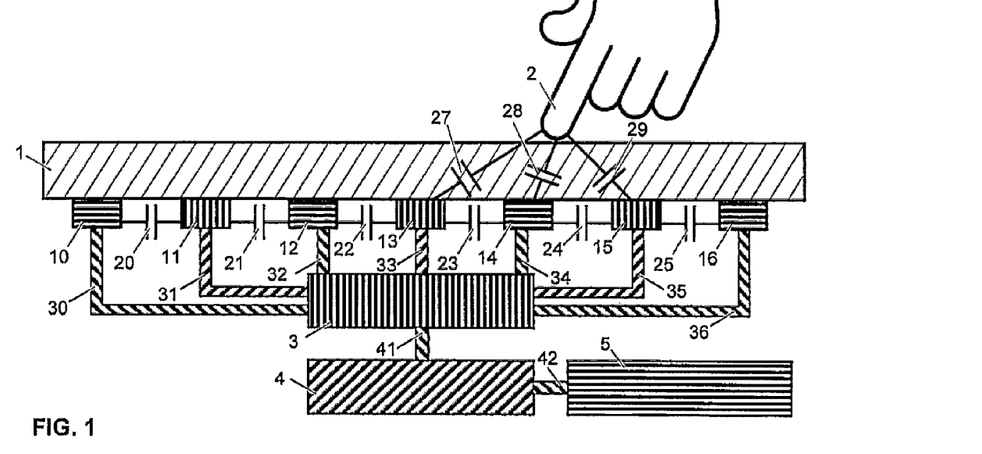
FIG. 1 is a schematic illustration of a capacitive touch screen display during a touch trigger command.
Figure 2:
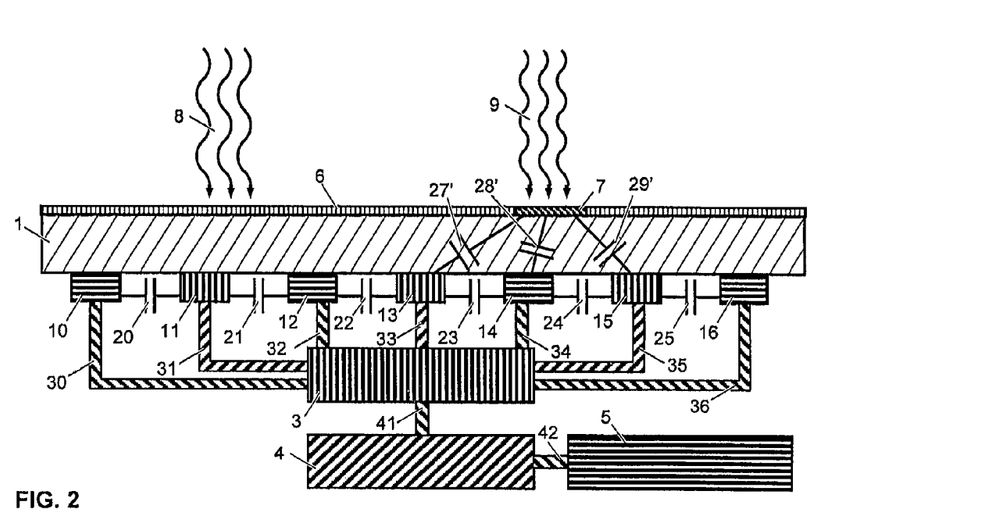
FIG. 2 is a schematic illustration of an optically controlled display during an optical trigger command.

A system employing one or more implementations of the current subject matter can include elements for directing a controller and one or more control signals, for detecting optical display control signals, and for processing the detected signals to resolve the presence, location, and/or nature of trigger signals. While reference is made to visible and invisible optical signals, other bands of electromagnetic signals can also be utilized. An example of present capacitive touch screen display control is provided in FIG. 1, which is then compared and contrasted with the optical display control example provided in FIG. 2, so the similarities and differences can be illustrated by example. Conspicuously absent in FIGS. 1 and 2 are the display light generating elements themselves, which have been removed for the sake of clarity. The present subject matter primarily concerns the process and configuration of display control as a functional means of providing user input, as opposed to the process and configuration of display lighting as a functional means of providing the user with information or feedback.

FIG. 1 is a schematic illustration of a capacitive touch screen display surface 1 being touched by a finger 2. Although FIG. 1 (and other figures, as well) are described with reference to a touch screen display, the display can also be a transparent (or semi-transparent) film overlay for a display which is provided with the capabilities described herein. Behind the display surface 1 in intimate contact with it is a series of electrodes, including a leftmost first electrode 10 connected by a first electrode trace 30 to a sensor module 3. Also behind the display surface 1 in intimate contact is a second electrode 11 connected by a second electrode trace 31 to a sensor module 3. Similarly, there are also a third electrode 12 connected by a third electrode trace 32, a fourth electrode 13 connected by a fourth electrode trace 33, a fifth electrode 14 connected by a fifth electrode trace 34, a sixth electrode 15 connected by a sixth electrode trace 35, and a seventh electrode 16 connected by a seventh electrode trace 36. FIG. 1 includes a sensor data channel 41 that communicates data between the sensor module 3 and the system processor 4. The system processor 4 further communicates to data storage 5 through a processor data channel 42. Together, these elements comprise the critical physical features of a capacitive touch screen display system, with many variants of structures, number and placement of electrodes, number and placement of sensor electronics, processors, data storage elements, and communications traces, paths, and channels present throughout the marketplace and the world.

The sense and control features of a capacitive touch screen display system are highlighted in FIG. 1. In regions of the touch screen display 2 where there is no finger 2 present, each of the electrodes has an essentially non-varying capacitance between each electrode. The leftmost first electrode 10, for example, has a first capacitance 20 between it and the second electrode. Similarly, a second capacitance 21 is between the second electrode 11 and the third electrode 12, and a third capacitance 22 between the third electrode 12 and the fourth electrode 13. When the capacitive touch screen display system is operating properly, each of these three capacitance values are typically similar, but most importantly, non-varying. In certain systems, they are varying, but vary in a known and predictable manner.

The electrodes on the right-most section of the display screen also have capacitance between each pair of electrodes. The fourth electrode 13 has a fourth capacitance 23 to the fifth electrode 14. Similarly, the fifth electrode 14 has a fifth capacitance 24 to the sixth electrode 15, and the sixth electrode 15 has a sixth capacitance 25 to the seventh electrode 16. These capacitance values were nominally equivalent and non-varying to the previous capacitances until a finger 2 enters into the system. A human finger 2 has a non-zero conductance, and a comparatively large surface area as an electrical element perturbing the display system. The finger 2 comes into contact with the display surface 1, a new capacitance is formed between the fourth electrode 13 and the finger 2 called a fourth electrode perturbation 27. Similarly, a fifth electrode perturbation 28 is formed as a capacitance to the fifth electrode 14, and a sixth electrode perturbation 29 is formed as a capacitance to the sixth electrode 15.

The result of adding these three capacitances and the resistance of the finger 2 is that the electrical circuit comprising the fourth, fifth, and sixth electrodes 13, 14, and 15, respectively, has changed. The net effect is an overall localized increase in the effective capacitance between the fourth and fifth electrode 13 and 14, and between the fifth and sixth electrode 14 and 15. These changes are sent to the sensor module 3 through the fourth electrode trace 33, the fifth electrode trace 34, and the sixth electrode trace 35. The sensor module 3 transforms the capacitance changes into a sensor signal, which is sent to the system processor 4. The sensor signal is then analyzed by the system processor 4 by comparing it to a defined set of trigger signal characteristics held in data storage 5. In the case of FIG. 1, the sensor signal is, in fact, determined to be a trigger signal, with this information provided to the rest of the computing device to activate whatever function that location in that application corresponds to.

The display surface 1 may be manufactured of a wide variety of materials using a wide variety of architectures and designs in accordance with the state of the art in display design and manufacturing technologies. These materials include a variety of glasses, polymers, and transparent compounds that are typically characterized as having high optical transparency and primarily dielectric electrical properties. The finger 2 is generally comprised of a human finger, having a wide range of electrical properties that are generally resistive but prone to generating electrical charge. Other materials and structures, however, can also be represented as having the functionality of the finger 2, including a wide variety of partially conducting stylus, glove, and prosthetic structures comprised of a wide variety of materials including conductive polymers and nanotechnology-enhanced materials. The first electrode 10 and the first electrode trace 30, along with all other electrodes and electrode traces, are comprised of a variety of materials in accordance with the state of the art in display design and manufacturing technologies, including transparent and translucent conductive metals and compounds, polymers, and nanoparticle, nanofiber, and nanotube composite materials.

The sensor module 3 is typically comprised of a variety of materials in accordance with the state of the art in electronics design and manufacturing technologies, including semiconductors such as silicon and silicon germanium, dielectrics such as silicon dioxide and silicon nitride, and metals such as aluminum and copper. Similar materials would also be used for the system processor 4, data storage 5, and associated traces and lines used for data transfer. All of the signal processing capabilities may be integrated into a single chip, a single component, a hybrid assembled board, or other configuration in accordance with the state of the art in electronics design and manufacturing technologies.

The size ranges of display surfaces 1 used with the current subject matter can in some implementations be in the range of approximately 1 cm$^2$ to 100 m$^2$. The thickness of these surfaces in some implementations is in the range of approximately 10 nm to 10 cm. This range can include sizes that are appropriate for disposable platforms, concealable systems, consumer electronics, portable computing systems, vehicle-mounted control centers, and fixed control centers. The size ranges of the first electrode 10, first electrode trace 30, and all other electrodes and electrode traces may optionally be in the range of approximately 10 nm to 10 mm, which covers the range of typical display electrode sizes in small consumer electronics through large area control center displays. The sizes of the sensor module 3, sensor processor 4, and data storage 5, as well as their associated communications lines can be any size and shape from 1 square micrometer to the full size of the display itself, as might be expected in the diverse fields of consumer, industrial, and government electronics.

The equivalent operation of a finger in contact with a capacitive touch screen display can be performed through the use of optical signals. FIG. 2 has a display surface 1 identical to that of FIG. 1, along with a first electrode 10 and all other electrodes, a first electrode trace 30 connected to a sensor module, as well as all other electrode traces. Similarly, a system processor 4 and data storage 5, as well as a sensor data channel 41 and processor data channel 42. A first capacitance 20 is present between the first electrode 10 and second electrode 11, as are all other inter-electrode capacitances.

The difference between FIGS. 1 and 2 is the presence of a display sensor film 6 and its interaction with incoming optical signals. A first optical signal 8 is illustrated as having a long wavelength and associated low frequency of laser energy and lower photonic energy level than a second optical signal 9 illustrated as having a shorter wavelength, higher frequency, and higher photonic energy level. The first optical signal 8 is shown to illuminate the leftmost region of the display surface 1 without affecting any capacitance values, just as the leftmost region of the display surface 1 of FIG. 1 has baseline capacitance values between electrodes. The second optical signal 9, conversely, is shown to illuminate a triggered film region 7 of the display sensor film 6. This triggered film region 7 serves to alter the electrical circuit characteristics of the electrodes nearest to it, adding a fourth optical perturbation 27' capacitance between the fourth electrode 13 and the triggered film region 7, and analogous to the fourth electrode perturbation 27 between the fourth electrode 13 and a finger 2. Similarly, a fifth optical perturbation 28' is formed between the fifth electrode and the triggered film region 7, and a sixth optical perturbation 29' is formed between the sixth electrode and the triggered film region 7, analogous to the fifth and sixth electrode perturbations 28 and 29, respectively.

As with the finger-induced capacitance changes of FIG. 1, the optically-induced capacitance changes of FIG. 2 are detected by the sensor module 3 through the fourth electrode trace 33, the fifth electrode trace 34, and the sixth electrode trace 35, and transformed into a sensor signal sent to the system processor 4. The sensor signal is analyzed by the system processor 4, comparing it to trigger signal characteristics held in data storage 5. As with FIG. 1, the sensor signal is determined to be a trigger signal, with this information provided to the rest of the computing device to activate application functions.

Systems employing one or more implementations of the current subject matter can include a semiconducting material as part of a display sensor film 6. A semiconducting material has a minimum energy level to generate free electron-hole pairs that provide conductivity, and this minimum energy level can be selected or engineered into many materials. With this property, the display sensor film 6 can become conductive only when illuminated with a particular trigger signal, such as a minimum particular frequency and intensity (received power per area) of laser energy.

The requirements for direct or indirect bandgap and conductivity can be determined using standard equations used by those skilled in the art. A direct bandgap material (e.g., InGaP) has a momentum of electrons in the conduction band the same as the momentum of holes in the valence band. An indirect bandgap material (e.g., silicon), conversely, requires the electron to pass through an intermediate state and transfer momentum to the crystal lattice, so these two electronic momentums will be different.

The differences between direct and indirect bandgap materials are important for the design of certain semiconducting devices and their interaction with (or generation of) optical signals. Light with a photon energy close to but above the band gap of a given semiconductor typically penetrates much farther into an indirect band gap material than it can a direct band gap material having an identical band gap value. In a direct band gap material, the light energy is typically absorbed quickly as it strikes the material, so a very thin layer of perhaps one micrometer or less could provide significant absorption and covert most of the illuminating energy into the process of electronic hole-pair generation. Indirect band gap materials also have a larger temperature dependence on light absorption, which may have an impact on material selection for specific applications, or on the material selection of the controllers needed.

As an example, consider the illumination of the display sensor film 6 in FIG. 2. The first optical signal 8 represents the 670 nm wavelength of an inexpensive AlGaInP red laser diode. Such a wavelength would theoretically provide sufficient energy to generate electron-hole pairs in a semiconducting material with a band gap of 1.4 eV or below, such as GaAs or silicon. The second optical signal 9 represents the 405 nm wavelength of an inexpensive InGaN laser diode. This higher frequency laser has photons with higher energy that can generate electron-hole pairs in a semiconducting material with a bandgap of 3.4 eV or below, such as silicon carbide or zinc oxide. In the case of FIG. 2, the display sensor film 6 has a bandgap of 3.2 eV, so the blue-violet optical signal has sufficient photon energy to generate electron-hole pairs and create the conductive triggered film region 7, whereas the red optical signal has insufficient photon energy to generate electron-hole pairs and affect conductivity. The display sensor film 6, therefore, ignores the energy provided by the first optical signal 8, and, indeed, that of any optical signal without photons having energy that meets or exceeds its bandgap.

To further detail the previous example, it is useful to consider several implementations of controllers that could be employed by a user of the previously described display system. Such controllers would contain a 670 nm AlGaInP red laser diode and a 405 nm InGaN blue-violet laser diode, two modules readily available at consumer-approved power levels with compact focusing optics at a low price point. Such controllers would have a trigger button with a touch-sensor and a trigger-press switch connected to the button. When the trigger was simply touched, the red laser would turn on, allowing the user to see their direction of aim. When the trigger was pressed, the blue laser would switch on and pulse briefly as a trigger signal. If the trigger were held down, the blue laser would turn on and stay on, enabling trigger signatures and patterns to be performed.

Other example controllers would have two or more buttons, with separately controlled tracking and triggering functions, or with a first button used as above while a second button transmits differently pulsed or coded signals. Such pulses may be as simple as a separate frequency of pulse repetition, to an amplitude varying pulse, to a more complex phase-based Barker Code or other code of varying amplitude, frequency, and time. This would enable the primary trigger to be separately identified from the secondary trigger, which would enable a secondary weapon or weapon mode to be fired in a gaming application, for example.

Some example controllers will have differently pulsed or coded signals even though they may appear identical to other controllers with their own pulsed or coded signals. A game, for example, may be configured to track the differently coded signals of four otherwise similar controllers on the same screen, and keep track of which controller is aiming and/or triggering at which locations. A government control system, for example, may be configured to ignore the commands of all other operators other than its own specially coded operator's controller. Such a system may be configured to ignore the commands issued by an operator's controller whenever a supervisor's controller is also aimed at the screen.

The physical shape of the example controllers described above can vary greatly. Some example controllers can be in the physical shape of a rod or wand, with the laser diodes emitting from the wand's tip, and the trigger button configured at the side. Such controllers would be held and used in a manner consistent with a wizard's implement. Some example controllers can be in the physical shape of a toy firearm, such as a pistol or sawed-off shotgun, with the laser diodes emitting from the barrel mouth(s) and with triggers in their normal real-life equivalent configuration. Such a controller might incorporate auxiliary rails and connectors for add-on equipment such as lights and optical sighs in a manner similar to some types of real weapons. Some example controllers will be integrated into other types of input devices, including television remote controls, legacy grip-based, joystick, or thumb-stick controllers, and might have optics that are unobtrusive and integrated into the body or extensions of such controllers. The actions of turning on tracking and triggering lasers will be combined with existing or auxiliary buttons. Some example controllers will be integrated into an instrumented glove or finger mount, enabling the use of other types of input devices with minimal impediment but providing the optical control function by pointing and aiming one or more fingers. All of these controller examples may appear very different and require different actions by the user to operate, but their system-level function is identical in terms of providing tracking and triggering signals based on user intent and action.

In some implementations, a library of trigger characteristics, signatures, or patterns can be empirically derived or electromagnetically modeled for a plurality of trigger signals and other control signals of interest. Received optical signals that are converted into sensor signals can have their characteristics compared to definitions in the library in order to determine whether the signals received comprise any trigger signals. As used herein, the term pattern can refer to a combination of characteristics of fragments/portions of a signature. Stated differently, a signature defines a set of processed signal characteristics that completely matches a specific trigger signal of interest (e.g. a personalized character illuminated with a gesture using laser light from a controller), while a pattern defines a match to a category of trigger signals of interest (e.g. a double click, or a FIG. 8 gesture). The library can also include data characterizing location and/or directionality of the objects (i.e., whether a login signature was performed in a particular corner of the display, or whether a virtual object in a particular location was double-clicked). The received optical signals can be modified, harmonized, and/or analyzed to reflect factors that can be relevant to identification, such as distance, angle, and phase or coding differences detected by different electrodes.

In some implementations, optical trigger signal processing can be used to recognize the presence of a type of trigger signal, though not necessarily an exact definition of a pre-determined trigger signal. A click and hold trigger signal, for example, may not be recognized as a defined trigger signal for a web browsing application shown on the display at the time of the triggering intent. The characteristics of the trigger signal can be recognized as a class of undefined signals, perhaps reported to the user with a request to define a new trigger signal which might not otherwise be present in the library. This is analogous to the manner in which handwriting experts identify characteristics of a particular writer, or face-recognition software can identify the presence of a face in an image due to common patterns (e.g., two eyes, a nose, mouth, chin, and hair), although it may not identify which person the face belongs to.

Figure 3A:
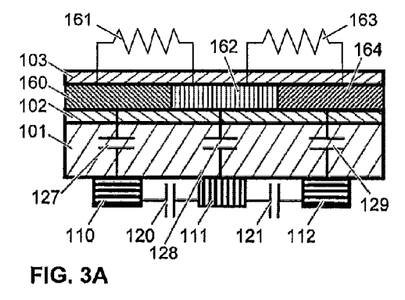
FIG. 3A is a schematic illustration of a magnified section of a polymer-based optically controlled display without a command.
Figure 3B:
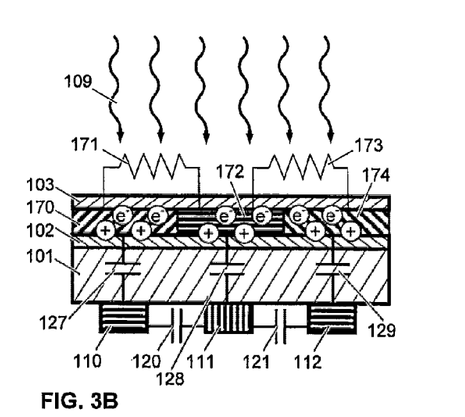
FIG. 3B is a schematic illustration of a magnified section of a polymer-based optically controlled display during a laser trigger command.
Figure 4A:
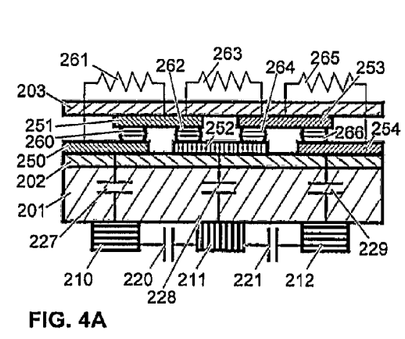
FIG. 4A is a schematic illustration of a magnified section of a nanoparticle-based optically controlled display without a command.
Figure 4B:
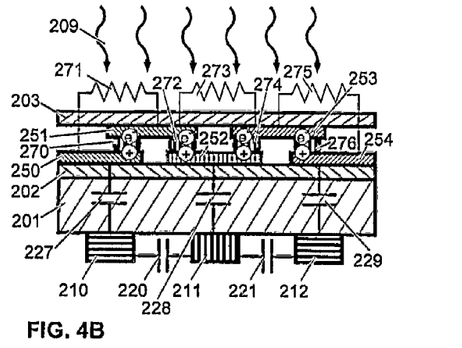
FIG. 4B is a schematic illustration of a magnified section of a nanoparticle-based optically controlled display during a laser trigger command.
Figure 5A:
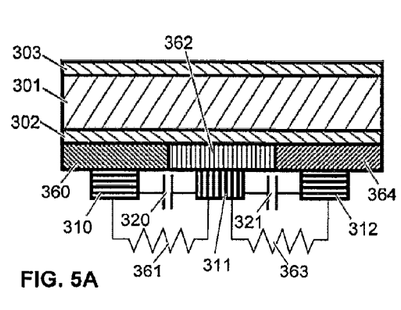
FIG. 5A is a schematic illustration of a magnified section of an integrated optically controlled display without a command.
Figure 5B:
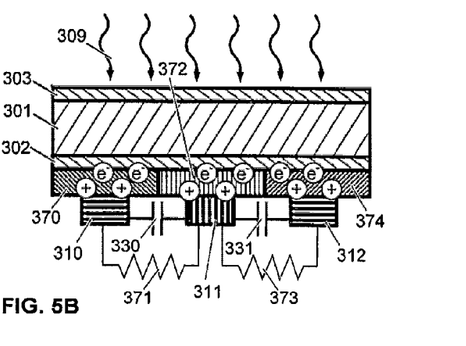
FIG. 5B is a schematic illustration of a magnified section of an integrated optically controlled display during a laser trigger command.

The architecture of a display sensor film and its means of direct and indirect interaction with a display surface in systems employing one or more implementations of the current subject matter can provide further advantages in design, manufacturing, or operation. FIGS. 3-5 illustrate three examples of implementing the sensor properties described by the operational schematic of FIG. 2. For purposes of ease of identifying relevant features, the enumeration of the elements in FIGS. 3-5 is performed in an equivalent manner, with the addition of 100 to the equivalent element performing a role in FIGS. 3A and 3B, addition of 200 to the equivalent element in FIGS. 4A and 4B, and addition of 300 to the equivalent element in FIGS. 5A and 5B. Where additional elements are present, enumeration follows a similar pattern for the benefit of the reader.

FIG. 3A illustrates a cross-sectional schematic of a region of a display embodying one or more implementations of the current subject matter, in that an optically sensitive, largely transparent semiconducting polymer film has been overlaid on top of a display surface region 101. Atop the display surface region 101 is an interface polymer 102, which provides adhesion between the display and the semiconducting polymer above. This semiconducting polymer is comprised of a first semiconducting polymer region 160, a second semiconducting polymer region 162, and a third semiconducting polymer region 164. A first lateral electrical resistance 161 is present between the first and second semiconducting polymer regions 160 and 162, respectively. A second lateral electrical resistance 163 is present between the second and third semiconducting polymer regions 162 and 164, respectively. Finally, a top polymer surface 103 provides a low-friction, non-reactive surface that is easy to keep clean and free of scratches and other blemishes that might otherwise degrade desirable optical and tactile qualities of the material.

Below the top polymer display elements are the capacitive sensing elements, which operate in a similar manner as those of FIGS. 1 and 2. There is a first regional electrode 110, a second regional electrode 111, and a third regional electrode 112. There is a first regional capacitance 120 between the first and second regional electrodes 110 and 111, respectively, as well as a second regional capacitance 121 between the second and third regional electrodes 111 and 112, respectively. In addition to these capacitances, there is a first polymer capacitance 127 between the first regional electrode 110 and the first semiconducting polymer region 160, a second polymer capacitance 128 between the second regional electrode 111 and second semiconducting polymer region 162, and a third polymer capacitance 129 between the third regional electrode 112 and third semiconducting polymer region 164.

The illustration of FIG. 3A is intended to represent a small region of a larger display system, perhaps only a few millimeters in size to coincide with the diameter of a low-power laser pointer spot. The polymer regions are shown as quantized into three sections to provide a simplified instructive example of one or more implementations of the current subject matter. In a realistic scenario, the semiconducting polymer regions might instead be a continuous and essentially planar sheet. In such a case, the polymer capacitances would not be quantized and limited to a one-to-one correspondence between electrodes and semiconducting polymer regions. Each electrode has a fractional capacitance to each part of a continuous polymer sheet. The details of continuum integration are left to those skilled in the art, so that a discrete example of a small integer number of electrodes and semiconducting regions can readily portray the concept of operation across a variety of implementations.

The concept of operation is seen in FIG. 3B, which illustrates a cross-sectional schematic of the same or similar region of FIG. 3A, except now illuminated with a highly energetic optical signal. The lower structures of the display surface and electrodes are identical to those of FIG. 3A, and refer to the same elements. The changes are in the effects of the polymer regional optical trigger 109. The polymer regional optical trigger 109 energy is absorbed by the semiconductor polymer regions, transforming them into a first activated polymer region 170, a second activated polymer region 172, and a third activated polymer region 174, each shown as having electrons ($e^-$) in the conduction band and holes (+) in the valence band active and ready to transport electrical signals.

The effect of the free electrons and holes in the activated polymer regions is to decrease the resistivity of the material comprising the first, second, and third activated polymer regions 170, 172, and 174, respectively. The net effect of this decreased resistivity is that an aggregate first lateral activated resistance 171 between a central point of the first activated polymer region 170 and the second polymer region 172 will be less than the first lateral electrical resistance 161 of FIG. 3A. Similarly, a second lateral activated resistance 173 between a central point of the second activated polymer region 172 and third activated polymer region 174 will be less than the second lateral electrical resistance 163 of FIG. 3A.

The change in resistance is dependent on a significant generation of the electron-hole pairs beyond that which would be associated with ambient sunlight or artificial light, or from the display itself, which helps ensure that an external optical signal was the source of the change in electrical resistivity. In a manner known to those skilled in the art of electrical circuit design and analysis, a significant change in resistance affects the circuit diagram defining the net reactance between the first regional electrode 110 and second regional electrode 111, as well as between the second regional electrode 111 and the third regional electrode 112. In essence, the first, second, and third polymer capacitance 127, 128, and 129, respectively, are essentially ignored in FIG. 3A, as they are electrically isolated by the highly resistive material as represented by the high resistance value of the first and second lateral electrical resistances 161 and 163, respectively. As these resistances decrease markedly in FIG. 3B, the values of the first, second, and third polymer capacitance 127, 128, and 129 become relevant with respect to the electrical circuit describing the region. Sensor electronics such as the sensor module 3 and/or system processor 4 of FIGS. 1 and 2 would detect this electrical circuit change using one or more of a variety of techniques and circuits known to those familiar with the state of the art in capacitive sensor electronics. It is worth noting that the effective change in resistance and capacitance values between electrodes can be equivalent to, less than, or more than the changes caused by the touching of a finger to the display. It is possible that in one or more implementations of the current subject matter, a display or film might be designed to be less sensitive to touch triggers than it is to optical signal triggers. It is also possible that in other implementations, a display or film might be designed to be more sensitive to touch triggers than it is to optical signal triggers, or perhaps require a separate electrical signal, software-defined code, or user trigger code to enable or modify sensitivity to one type of control or another.

FIGS. 4A and 4B describe an alternative architecture that uses semiconducting particles in a region of a display screen, as might be found in one or more implementations of the current subject matter. FIG. 4A illustrates an optically sensitive, largely transparent set of materials that have been added to a display surface location 201. Atop the display surface location 201 is an interface dielectric 202, which provides adhesion between the display and the transparent conducting elements and particles above. Atop this interface dielectric 202 is a first transparent trace 250 in intimate contact with a first semiconducting particle 260, which is itself in intimate contact with a second transparent trace 251. A first trace resistance 261 defines the resistance between the first transparent trace 250 and the second transparent trace 251, in a manner largely dependent on the electrical contact and conductivity of the first semiconducting particle 260.

In an identical manner, a second path of traces and associated resistance is readily seen in FIG. 4A. The second transparent trace 251 is in intimate contact with a second semiconducting particle 262, which is itself in intimate contact with a third transparent trace 252. A third semiconducting particle 264 then leads to a fourth transparent trace 253, with a second trace resistance 263 defined between the second and fourth transparent traces 251 and 253, respectively. In much the same manner, a fourth semiconducting particle 266 connects the fourth transparent trace 253 to a fifth transparent trace 254, with a third trace resistance 265 illustrated. All three resistances 261, 263, and 265 are high value resistances, effectively isolating the electrode capacitances from the transparent traces by virtue of the highly resistive native state of the semiconducting particles 260, 262, 264, and 266

The lower portion of the display contains the capacitive sensing elements, which operate in a similar manner as those of FIGS. 3A and 3B. There is a first location electrode 210, a second location electrode 211, and a third location electrode 212. There is a first location capacitance 220 between the first and second location electrodes 210 and 211, respectively, as well as a second location capacitance 221 between the second and third location electrodes 211 and 212, respectively. In addition to these capacitances, there is a first particle capacitance 227 between the first location electrode 210 and the first transparent electrode 250, a second particle capacitance 228 between the second location electrode 211 and third transparent electrode 252, and a third particle capacitance 229 between the third location electrode 212 and fifth transparent electrode 254.

The concept of operation illustrated in FIG. 4B is analogous to the operation illustrated in FIG. 3B. The lower structures of the display surface and electrodes are identical to those of FIG. 4A, and refer to the same elements. The changes are in the effects of the semiconducting particles due to the particle location optical trigger 209. The particle location optical trigger 209 energy is absorbed by the semiconducting particles, transforming them into a first activated particle 270, a second activated particle 272, a third activated particle 274, and a fourth activated particle 276, each shown as having electrons ($e^-$) in the conduction band and holes (+) in the valence band active and ready to transport electrical signals.

As in the description of FIG. 3B, the effect of the free electrons and holes in the activated particles of FIG. 4B is to decrease the resistivity of the material. The net effect of this decreased resistivity is that a first activated trace resistance 271 between the first transparent electrode 250 and second transparent electrode 251 will be less than the first trace resistance 261 of FIG. 4A. In the same manner, a second activated trace resistance 273 between the second transparent electrode 251 and the fourth transparent electrode 253 will be less than second trace resistance 263 of FIG. 3A. Similarly, a third activated trace resistance 275 between the fourth and fifth transparent electrodes 253 and 254, respectively, will be less than the third trace resistance 265.

As in the description of FIG. 3B, a significant change in resistance affects the circuit diagram defining the net reactance between the first location electrode 210 and second location electrode 211, as well as between the second location electrode 211 and the third location electrode 212. Sensor electronics detect this electrical circuit change using one or more of a variety of techniques and circuits.

A third example architecture using an integrated approach to the arrangement of display materials is provided in FIGS. 5A and 5B, as might be found in one or more implementations of the current subject matter. FIG. 5A illustrates an optically sensitive, largely transparent set of materials that have been added atop and below a display surface area 301. Atop the display surface area 301 is a top surface material 303, which provides anti-glare optical and scratch-resistant mechanical properties. Below the display surface area 301 is an interface material 302, which provides adhesion to the sensor elements below. Below this interface material 202 is a first sensor element 360, a second sensor element 362, and a third sensor element 363. Attached to the first sensor element is a first area electrode 310. Attached to the second sensor element 362 is a second area electrode 311, and to the third sensor element 364, a third area electrode 312.

The electrical properties of the arrangement in FIG. 5A are defined by a simplified arrangement of capacitances and resistances in the same manner as previous examples. A first area capacitance 320 and a first area resistance 361 are each defined between the first area electrode 310 and second area electrode 311. Similarly, a second area capacitance 321 and a second area resistance 363 are each defined between the second area electrode 311 and a third area electrode 312.

The concept of operation illustrated in FIG. 5B is analogous to the operation illustrated in FIG. 3B. The upper structures of the display surface area 301, top surface material 303, interface material 302, and area electrodes 310, 311, and 312 are identical to those of FIG. 5A, and refer to the same elements. The changes are in the sensor elements due to the sensor area optical trigger 309. The sensor area optical trigger 309 transforms the first sensor element 360 into a first activated element 370, the second sensor element 362 into a second activated element 372, and a third sensor element 364 into a third activated element 374. The electrical circuit that defines the status of the elements is similarly transformed, with the resistances between the elements transforming into a first activated element resistance 371 and second activated element resistance 373, and the capacitances between the elements transforming into a first activated element capacitance 330 and a second activated element capacitance 3331.

As in the description of FIG. 3B, the effect of the free electrons and holes in the activated particles of FIG. 5B is to decrease resistivity, along with altering other optoelectronic properties of the material due to the exposure to the trigger signal. An associated effect occurs with a changing equivalent capacitance between the elements, for another detectable electrical change. As with previous examples, electronics detect these electrical changes using one or more of a variety of sensor techniques and circuits.

Materials considerations for the examples of FIGS. 3A, 3B, 4A, 4B, 5A, and 5B are similar to the considerations for FIG. 1, in that a variety of dielectric, semiconducting, and conductive materials and composites may be employed in various implementations of the present subject matter. Numerous polymers and compounds are available in semiconducting and conducting forms, for example, including both direct and indirect band gap materials with a variety of conductivity ranges. Conductivity can also vary by direction of travel, such as lateral planar conductivity being high in a particular material, but with low zenithal conductivity through the thickness of the material. Nanoparticles, nanofibers, and nanotubes of varying configurations and materials are also envisioned as being suitable for use in various implementations of the present subject matter. Nanomaterials may be used as augmentations for other materials, such as polymer or liquid films, formed into other elements, or they may be used as the enabling elements themselves, such as the semiconducting particles of FIGS. 4A and 4B.

Size considerations for the examples of FIGS. 3A, 3B, 4A, 4B, 5A, and 5B are similar to the considerations for FIG. 1, in that a variety of planar dimensions, thicknesses, and distances may be present in various implementations of the present subject matter. Element dimensions can span the range of dimensions used by those skilled in the art of display design and manufacturing, as well as the range of dimensions used by those skilled in the arts of electronics and nanomaterial design and manufacturing. Layer thicknesses and particle dimensions in these industries range from a fraction of one nanometer to tens of millimeters, with most materials in the 10 nm to 1 mm range. Element planar dimensions in these industries typically range from tens of nanometers to meters in size. Transparent electrodes in consumer electronics, for example, may be no more than a few microns across, whereas the display screen size for a control center often reaches several meters.

Figure 6:
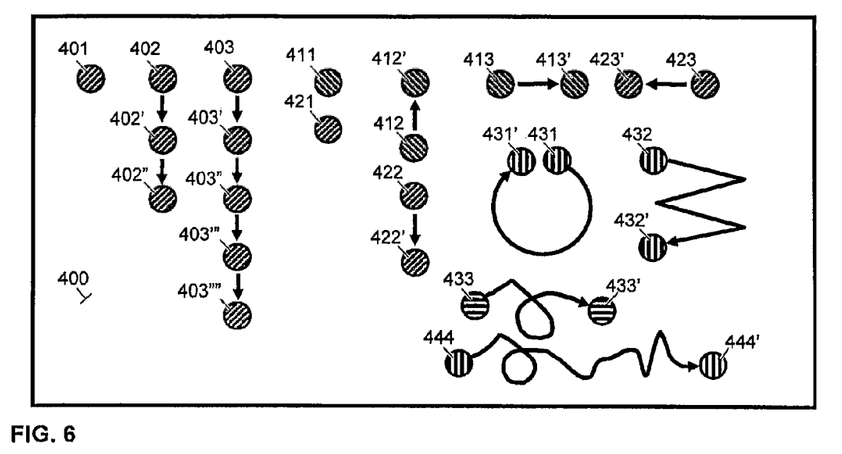
FIG. 6 is a plan-view schematic illustration of optical trigger and gesture commands for an optically controlled display.

FIG. 6 is a schematic illustration of a selection of optical trigger signals and gestures. The bounding rectangle of FIG. 6 is marked as an optically sensitive display 400, with a number of circles representing illuminated spots on the surface of a type and intensity of electromagnetic signal that can be detected by the optically sensitive display 400. The first spot in the upper left represents a simple trigger 401, which is illustrated as a single spot that is "clicked" over a short period of time in a manner analogous to a mouse click. The second trigger signal illustrated is a drag trigger 402, which has the trigger signal turned on, held down, and moved in a manner analogous to a mouse click-and-drag function. The spot is shown to move to an intermediate drag position 402', and then to a final drag position 402" before the trigger signal is completed.

A third, more complex type of single optical signal trigger is a coded drag 403, which is not a feature easily replicated in legacy control technologies such as joysticks, mice, or keyboards. In the coded drag 403, the optical signal path is moved in a lateral direction as the click-and-drag, except the optical signal changes over time as it translates. In FIG. 6, it is shown to transform to a second coded drag 403' which may be in an off position, an alternative frequency, a different phase, or combination of codes and other variants. In this example, we portray the second coded drag 403' as being a lower frequency optical signal with reduced photon energy below the sensitivity level of the optically sensitive display 400. The trigger signal continues to a third coded drag 403", shown as returning to the original triggering energy level, a fourth coded drag 403'" at the lower level, and finally to a fifth coded drag 403"" whereupon the trigger signal is completed. Such a complex code would be challenging to encode into a mouse, but is a trivial matter with nearly infinite variety using optical control techniques in various implementations of the present subject matter.

The use of multiple simultaneous optical signals is supported in many implementations of the present subject matter. A pair of optical signal spots is illustrated in FIG. 6 as a first paired simple spot 411 and a second paired simple spot 421. In this trigger signal, two optical signals are transmitted, detected, and identified as a "dual click" type of command, analogous to a "click both mouse buttons at once" command sometimes supported by advanced mouse controllers. A familiar variant of this type of multi-signal trigger is shown by a first initial expand spot 412 and a second initial expand spot 422. These spots are triggered and held as they are dragged in opposing lateral directions. After a short period of translation, the first optical signal reaches a first later expand spot 412', and the second reaches a second later expand spot 422'. Such a trigger signal might be analogous to a "multi-touch expand window" feature on a consumer electronics capacitive touch screen. In a similar fashion, the first initial shrink spot 413 and second initial shrink spot 423 are triggered and dragged closer to each other to reach a first later shrink spot 413' and a second later shrink spot 423', in analogous fashion to a "multi-touch shrink window" feature used in conventional devices. Numerous other multi-spot trigger signals are conceived of in various implementations of the present subject matter.

In multiple implementations of the present subject matter, multiple users are differentiated by the sensor and/or processor based on differences in received optical signals. Such a feature would be critical for when multiple users are competing in a game, when multiple people are training on the same display, or when a supervisor is given control over-ride authority for the displays of his or her operators. Such capabilities can be incorporated through a variety of means, including the use of different frequencies, phases, or amplitudes of their optical signals. They may also be changing frequencies, phases, or amplitudes over time in a different and detectable manner, in a manner analogous to many coding schemes for data transmission.

A feature that is challenging to perform in many contemporary display control technologies is the ability to recognize gestures. Handwriting identification has long been a struggle for smartphones, computers, and other processor platforms, but the achievements in signal processing enable these features to be employed in various implementations of the present subject matter. A circular click and drag, for example, is shown starting with a gesture circle start 431, progressing in a circular or ovoid fashion, and ending with a gesture circle end 431'. This gesture can be assigned to a specific universal action, such as "refresh screen", or to a specific application action, such as "reload browser". These trigger gestures may be assignable by the user, a developer, or both, and may vary between applications and users. Another, more complex gesture is shown with a gesture zig start 432, progressing in a zig zag pattern, and ending with a gesture zag end 432'. This gesture might be considered either a nuisance or nonsense by conventional display screen control techniques or legacy controllers, but becomes a powerful and infinitely expandable tool for developers and users of the present subject matter.

Even further complexity in gestures can be implemented when combining multi-signal controllers and sensing capabilities with gesture recognition and other types of coding. A dual signal gesture with a high degree of personalization is illustrated in FIG. 6 as combining a first signature start 433 using a first optical signal, and a second signature start 444 using a second optical signal. The signature progresses using both optical signals for a period of time. After the signature is part way through completion, the first optical signal ends, resulting in a first signature end 433', which may be a rectifiable mistake, or may be a feature of the trigger signal as learned by the user and processor, and as retrieved from data storage. Meanwhile, the second optical signal completes to a second signature end 444', and the trigger signal is checked against the library, and then approved or denied. The complexity of potential trigger signals, trigger gestures, and combinations of patterns and signatures is limited only by the processing power and data storage available in a given system employing the present subject matter.

Figure 7:
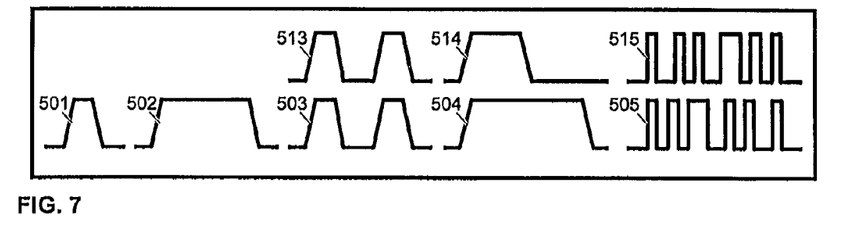
FIG. 7 is a schematic illustration of optical trigger and gesture command timing.

The timing of various trigger signals and gestures has been previously discussed, but FIG. 7 serves to provide several concrete examples of the timing of trigger signals. The x-axis is a time axis, with a short traverse representing a short time frame, such as a click or a pause, a break in a line as representing a separation of trigger signals (e.g., a long pause), and a pulse train as representing a very short coding of pulses faster than an operator could normally click, and limited in speed only by the ability of a given display sensor to transform the signal into resolvable sensor data for processing and analysis. There are two "tracks" shown in FIG. 7, representing two different optical signals so that multi-signal trigger examples can be discussed. In certain implementations according to the present subject matter, there is no practical limit to the number of different optical signals that can be used to create very complex multi-signal trigger signals and gestures, and the timing associated with these triggers may be very complex.

The simplest example is a simple click pulse 501, which shows a single optical signal starting at an effectively zero or low level. The optical signal increases to a minimum triggering level with a fairly quick ramp rate as the user operates the trigger on the controller. The triggering level is maintained for a short period of time, then is turned off, with a relatively quick drop-off back to an effectively zero or low level. This process of "clicking" might take no more than a few tens of milliseconds based on typical human response times, or it may be significantly faster if the click duration is defined by electronic means. It is important to the designer of systems embodying this subject matter to be cognizant of electrical and operator delays when designing a system or set of trigger signals, as the display sensor materials, electrodes, and other elements and configurations, along with the sensor module, processing electronics, and data storage access must operate in a similar time frame.

FIG. 7 further illustrates a natural extension of the simple click, with a click-hold pulse 502 timing, such as might be required by the drag trigger 402 of FIG. 6. The timing of these types of trigger signal is very similar to the simple click pulse 501, in that an initially low signal is increased to a trigger level quickly, except it is held for a comparatively extended period of time, perhaps while other operations are taking place, such as the lateral translation of the optical signal location such as the intermediate and final drag positions 402' and 402", respectively. The timing of the click-hold pulse 502 does not separately consider the location of the optical signal, so other information is necessary to define a trigger signal or trigger gesture. The same timing would also be used by the gesture circle and gesture zig zag, for example.

The third timing diagram in FIG. 7 illustrates a multi-signal trigger timing for a double click operation. A first multi-double pulse 503 appears to rise and fall then rise and fall in a manner analogous to sequential simple click pulses. A second multi-double pulse 513 has the same timing and features. A trigger signal with this timing might include a "two-laser double click" operation, and may or may not require lateral translation of one or more of the optical signals. A second user-performed multi-signal timing diagram follows, where a first multi-gesture pulse 504 rises to a high sustained trigger at an essentially equivalent time as does a second multi-gesture pulse 514. However, the second multi-gesture pulse 514 ends much sooner, returning to the zero/low state long before the first multi-gesture pulse 504. Such timing might be used in the complex gesture of FIG. 6 identified with the first signature start 433 and the second signature start 444. The second signature end 444' is implied to end much sooner than the first signature end 433'.

The final timing diagram of FIG. 7 is a pair of encoded pulse trains for two optical signals. The first encoded pulse 505 has a pair of short pulses, a medium length pulse and delay, then a train of three more short pulses. This pulse sequence is different than the second encoded pulse 515, which has a trio of short pulses with varying timing, then a medium sized pulse, followed by two short pulses. These pulses represent short bursts of optical signals that are much faster than can be transmitted by a human operator, and are synthesized and generated electronically. Such a pulse train can inform an optical display system that the trigger signals being sent by this controller might be from a supervisor, or another operator that may have more or less priority than the primary user. Such a pulse train might also include data associated with the timing and location of the controller in some implementations of the present subject matter. Designers skilled in the art will find many other interesting features and data to encode on display control pulse trains, that will generally be intended to be recognized by the system processor.

Figure 8:
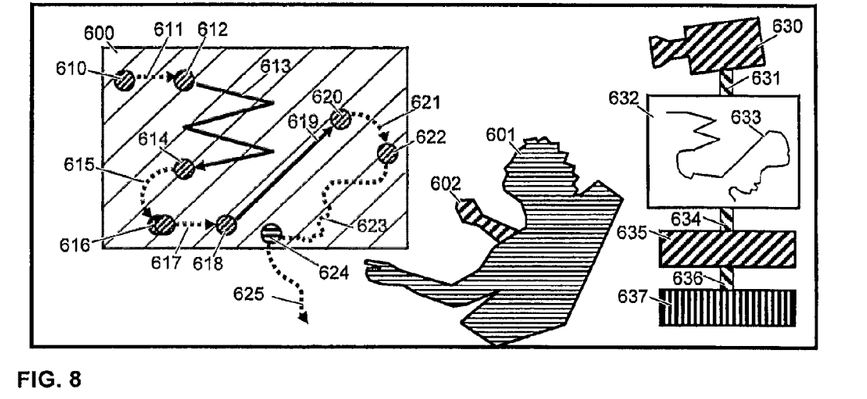
FIG. 8 is a schematic illustration of monitoring the user of an optically controlled display.

Optical display control enables a variety of other potential system benefits for gamers, equipment operators, and control center personnel. FIG. 8 illustrates one such benefit, the monitoring of operator physiological and psychological health through performance tracking and signal processing. An optically controlled display 600 in front of a user 601 is being triggered by a controller 602. The triggering spots (clicks) are shown as circles, the click-and-drag operations are shown as solid arrows, and the monitoring of non-trigger movement of the controller is shown as dotted lines. In the example of FIG. 8, it is assumed that the operator can see a tracking signal (i.e., a red laser pointer dot the user may turn off), and may be able to see the triggering signal (i.e., a blue-violet laser pointer dot that the user turns on only when triggering commands), but cannot see the monitoring signal (i.e., an infrared laser pointer dot that does not turn off). FIG. 8 shows only the monitoring signals and triggering signals, as the tracking signals are not necessarily required for operator monitoring.

The monitoring is provided by an infrared camera 630, which tracks the infrared monitoring signals at all times, and has an infrared data channel 631 attached to a camera display 632 which displays monitoring data 631 in a variety of forms. There is also a monitoring data channel to a monitor processor 635, and a process data channel 636 to monitor data storage 637. The monitor processor 635 continuously examines the monitoring data 631 to identify symptoms of reduced operator effectiveness, such as optical signal drift, indicating fatigue, or jitter, indicating heightened stress level. The processor would also include some sort of alert capability to notify a supervisor and/or the user of degraded performance, and perhaps make a request for aid or relief to address potential problems before performance degrades further.

A tracking example is illustrated in FIG. 8, which begins with a starting spot 610. The user 601 moves her controller 602 to translate the optical signal along a right directed path 611 to a trigger gesture start location 612. The user then triggers the signal and performs the trigger gesture 613, analogous to the gesture zig-zag of FIG. 6, and ending at the trigger gesture end location 614. All of these initial operations are tracked continuously by the camera display 632 and monitor processor 635, and no faults or degrade performance is detected. The user continues with a curved translation 615 to a new operation point, where she needs to execute a double click 616, perhaps to launch a new application from her desktop. To increase the size of a window that pops up, she translates a short path 617 to an expand start location 618. She clicks and drags 619 to an expand end location 620, and her work is progressing smoothly according to the monitor processor 635 as compared to performance characteristics in data storage 637.

With the application underway and the window expanded, the user settles in to watch a short video of cats wearing party hats. She moves her controller from the expand end location 620 along a slow path to a simple trigger 622 on the window to increase the volume on the video. Unfortunately, the user did not have coffee this morning, and this combined with the lack of engaging video options starts to slow her reactions. The controller drifts downward along a meandering path 623, which is captured by the camera display 632 and recognized by the monitor processor 635 as a potential problem. The monitor sends her a brief alert sound, which captures her attention and accidentally causes an unintended trigger 624. Her controller then drifts to the floor 625 as she turns to her office mates to ask if anyone is making coffee soon. If this scenario had taken place during the operation of a military unattended air vehicle, there are several major potential risks that could have been avoided with the automated presence of a discreet monitoring system.

The subject matter described herein may be embodied in systems, apparatus, methods, and/or articles depending on the desired configuration. In particular, aspects of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, stored memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows described herein do not require the particular order shown, or sequential order, to achieve desirable results. Other embodiments may be within the scope of the following claim.

What is claimed is:

1. A method comprising:
    transmitting electromagnetic signals towards a display, the transmitted signals comprising two or more frequencies;
    receiving at least one of the frequencies of electromagnetic signals that illuminate one or more regions of the display;
    transforming the received electromagnetic signals into received sensor signals;
    wherein at least one of the frequencies of electromagnetic signals illuminating one or more regions of the display is not transformed;
    wherein received sensor signals are compared to a library of signatures or patterns for a plurality of control commands, and data based on the comparison is provided; and
    wherein the received sensor signal signatures or patterns characterize variances in phase and amplitude with time.

2. A method as in claim 1, wherein the location of the illuminated region of the display by one or more of the received and transformed electromagnetic signal frequencies is identified and provided as data describing the received sensor signal.

3. A method as in claim 1, wherein the electromagnetic signals include optical signals of one or more frequencies visible to the human eye.

4. A method as in claim 1, wherein the electromagnetic signals include optical signals of one or more frequencies invisible to the human eye.

5. A method as in claim 1, wherein the electromagnetic signals include optical signals of a frequency generated at a generally low intensity by the display.

6. A method as in claim 1, wherein the electromagnetic signals were transmitted with directivity greater than 1,000.

7. A method as in claim 1, wherein the signatures or patterns each characterize variances in phase and amplitude with both time and frequency to differentiate desired control signals.

8. A method as in claim 1, wherein the transmitter incorporates one or more laser diodes.

9. A method as in claim 8, wherein one laser diode generates a frequency of light having a wavelength shorter than 450 nm.

10. A method as in claim 8, wherein one laser diode generates a frequency of light having a wavelength longer than 800 nm.

11. A method as in claim 1, wherein the data characterizing the received sensor signal identifies the directionality of the transmitter relative to the display.

12. A method as in claim 1, wherein the data characterizing the received sensor signal identifies a category of transmitter.

13. A method as in claim 1, wherein the data characterizing the received sensor signal identifies a specific user of the display.

14. A method as in claim 1, wherein different users employ different combinations of frequency, phase, or amplitude over time when transmitting trigger signals.

15. A method as in claim 1, further comprising: processing the received sensor signals to resolve and identify characteristics of user gestures.

16. A method as in claim 1, wherein the transformation of the electromagnetic energy to a received sensor signal is performed in part by a semiconducting material.

17. A method as in claim 1, wherein the transformation of the electromagnetic energy to a received sensor signal includes a localized change in conductivity.

18. A method as in claim 16, wherein the semiconducting material includes a polymer.

19. A method as in claim 16, wherein the semiconducting material is essentially transparent to visible light.

20. A method as in claim 1, wherein the data includes the identification of a specific user.

21. A method as in claim 1, wherein the data includes characteristics associated with the user's physiological or psychological status.

22. A method as in claim 1, wherein the transformation of the electromagnetic energy to a received sensor signal is performed in part by touch screen sensor electronics.

23. A remote optical display control system comprising:
an outbound control apparatus that transmits an outbound optical signal towards a display apparatus; and
a display sensor forming a part of the display apparatus and configured to receive the inbound optical signal from the control apparatus and transform the optical signal into a sensor signal;
at least one processor is coupled to a data store, the data store storing a library of empirically or theoretically derived signatures or patterns for a plurality of different control commands
wherein the display sensor was not manufactured with, nor integral to, the display apparatus;
wherein the display sensor has been mounted atop the display apparatus surface; and
wherein the processor is configured to analyze the transformed sensor signals to determine whether a control apparatus is illuminating one or more regions of the display and to identify a control command by comparing the sensor signals to the library of empirically or theoretically derived signatures or patterns.

24. A system as in claim 23, wherein the control apparatus incorporates one or more laser diodes.

25. A system as in claim 23, wherein the display sensor incorporates a semiconducting material.

26. A system as in claim 23, wherein the processor identifies the characteristics of a specific user.

27. A system as in claim 23, wherein the processor identifies the characteristics of a user's physiological or psychological status.

28. An overlay for a display comprising:
a polymer layer with high transparency that physically attaches to the display,
a material layer that changes electrical characteristics when illuminated with laser energy, and
a means to detect the change in electrical characteristics of the overlay;
wherein the display is a capacitive touch-sensitive screen; and
wherein the detection of the change in electrical characteristics is performed in part by the capacitive touch-sensitive screen electronics.

29. A system as in claim 28, wherein the capacitive touch screen maintains sensitivity to conventional fingertip commands.

30. A method as in claim 28, wherein the change in electrical characteristics is due to semiconducting properties.

31. An overlay as in claim 28, wherein the polymer layer may be readily attached to the display by a person having no training, skill, or art in electronics design, manufacturing, or assembly.

32. An overlay as in claim 28, wherein the polymer layer may be readily removed from the display by a person having no training, skill, or art in electronics design, manufacturing, or assembly.

* * * * *